United States Patent
Kim et al.

(10) Patent No.: US 12,158,686 B2
(45) Date of Patent: Dec. 3, 2024

(54) METHOD FOR SURFACE FUNCTIONALIZATION USING SINGLE PHOTON SOURCE

(71) Applicant: KOREA INSTITUTE OF SCIENCE AND TECHNOLOGY, Seoul (KR)

(72) Inventors: Kayoung Kim, Seoul (KR); Chulki Kim, Seoul (KR); Jae Hun Kim, Seoul (KR); Taikjin Lee, Seoul (KR); Sang Wook Han, Seoul (KR); Seungwoo Jeon, Seoul (KR); Yu Kyeong Kim, Seoul (KR); Young Tae Byun, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 197 days.

(21) Appl. No.: 17/956,337

(22) Filed: Sep. 29, 2022

(65) Prior Publication Data
US 2023/0194953 A1 Jun. 22, 2023

(30) Foreign Application Priority Data
Dec. 17, 2021 (KR) .................. 10-2021-0181873

(51) Int. Cl.
  *G02F 1/355* (2006.01)
  *G02F 1/35* (2006.01)
  *G02F 1/361* (2006.01)
(52) U.S. Cl.
  CPC .......... *G02F 1/3551* (2013.01); *G02F 1/3501* (2013.01); *G02F 1/3615* (2013.01)

(58) Field of Classification Search
  CPC ..... G02F 1/3501; G02F 1/3551; G02F 1/3615
  See application file for complete search history.

(56) References Cited

U.S. PATENT DOCUMENTS

| | | | |
|---|---|---|---|
| 5,397,428 A * | 3/1995 | Stoner | C23C 16/02 117/103 |
| 6,068,883 A | 5/2000 | Deguchi et al. | |
| 8,686,377 B2 * | 4/2014 | Twitchen | C30B 25/105 250/493.1 |

(Continued)

FOREIGN PATENT DOCUMENTS

| | | |
|---|---|---|
| EP | 3 250 936 B1 | 11/2019 |
| KR | 10-0262259 B1 | 7/2000 |

(Continued)

OTHER PUBLICATIONS

English Translation from Written Opinion of Korean Intellectual Property Office, for KR 2021-0181873, dated Apr. 15, 2024, 4 pages. (Year: 2024).*

(Continued)

*Primary Examiner* — Daniel Petkovsek
(74) *Attorney, Agent, or Firm* — NSIP Law

(57) ABSTRACT

One aspect of the present disclosure is a method for selective surface functionalization using a single-photon source. The method for selective functionalization using a single-photon source includes: (a) adding a single-photon source to a solution containing a photosensitizer and a monomer; and (b) emitting a single photon from the single-photon source. One aspect of the present disclosure is a selectively functionalized single-photon source prepared by the method.

7 Claims, 5 Drawing Sheets

(56) References Cited

U.S. PATENT DOCUMENTS

| | | | |
|---|---|---|---|
| 9,169,989 B2* | 10/2015 | Twitchen | G02B 1/02 |
| 9,486,163 B2* | 11/2016 | Acosta | A61B 5/742 |
| 9,518,336 B2* | 12/2016 | Markham | G01N 21/64 |
| 2016/0077127 A1* | 3/2016 | Fiorini | G01Q 60/22 |
| | | | 427/532 |
| 2022/0381979 A1* | 12/2022 | Brash | G02B 6/1225 |

FOREIGN PATENT DOCUMENTS

| | | |
|---|---|---|
| KR | 10-1539389 B1 | 7/2015 |
| KR | 10-2021-0032016 A | 3/2021 |
| WO | WO 2020/232140 A1 | 11/2020 |

OTHER PUBLICATIONS

Pop-Georgievski, Ognen, et al. "Polydopamine-modified nanocrystalline diamond thin films as a platform for bio-sensing applications." Thin Solid Films 543 (2013): 180-186.

Jung, Hak-Sung, et al. "Surface modification of fluorescent nanodiamonds for biological applications." *Nanomaterials* vol. 11. Issue 1 (2021): 153. pp. 1-23.

Zhang, Tongtong, et al. "Toward quantitative bio-sensing with nitrogen-vacancy center in diamond." *ACS sensors* vol. 6. Issue 6 (2021). pp. 2077-2107.

Liu, Yanlan, et al. "Polydopamine and its derivative materials: synthesis and promising applications in energy, environmental, and biomedical fields." *Chemical reviews* vol. 114. Issue 9 (2014). pp. 5057-5115.

Shi, Fazhan, et al. "Single-DNA electron spin resonance spectroscopy in aqueous solutions." *Nature methods* vol. 15. Issue 9 (2018). pp. 697-702.

Sushkov, A. O., et al. "All-optical sensing of a single-molecule electron spin." *Nano letters* vol. 14. Issue 11 (2014). pp. 6443-6448.

* cited by examiner

[FIG. 1]
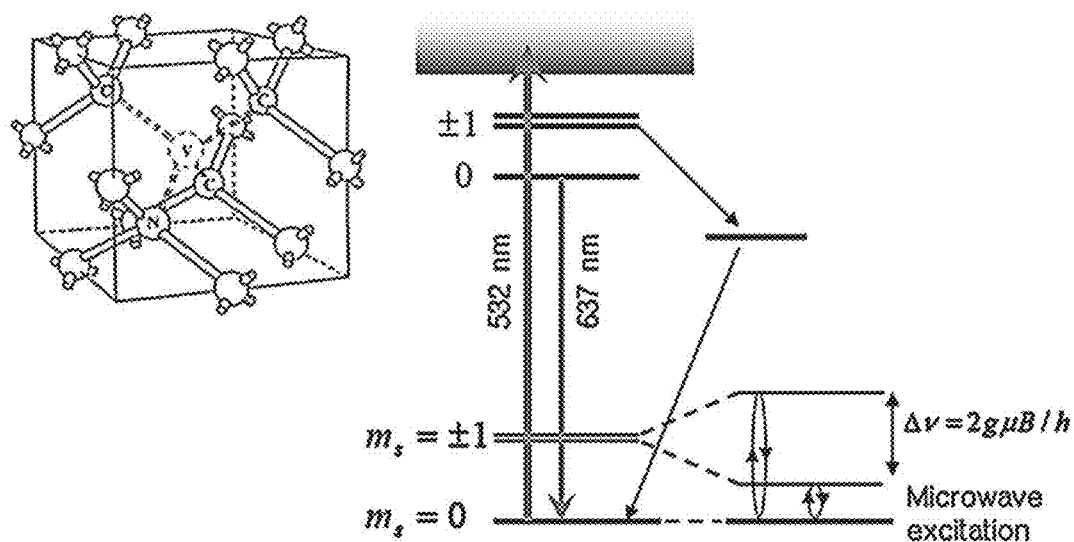

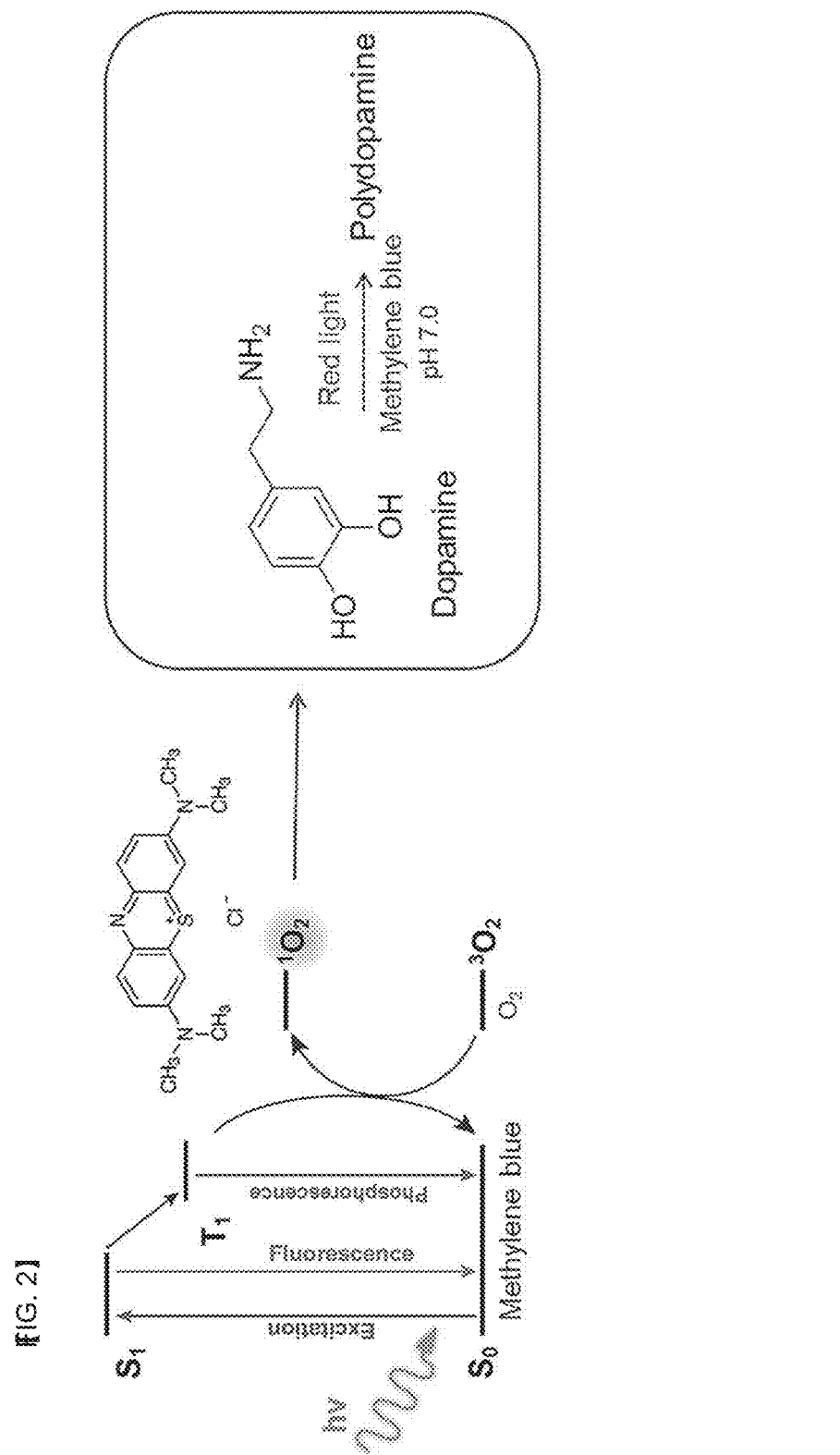
FIG. 2]

[FIG. 3A]
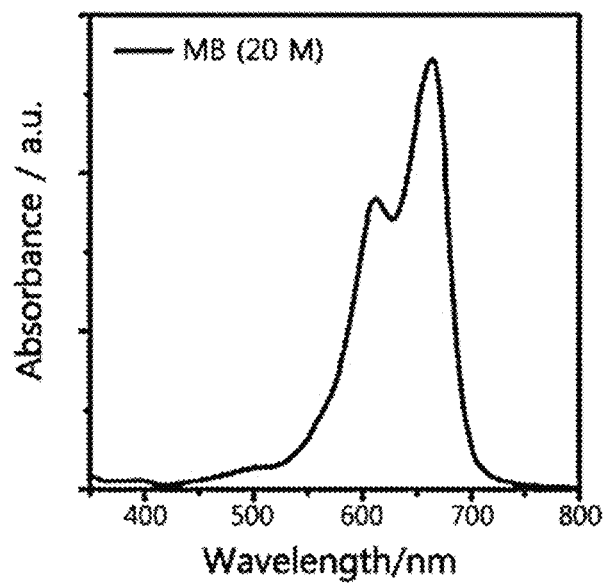
[FIG. 3B]
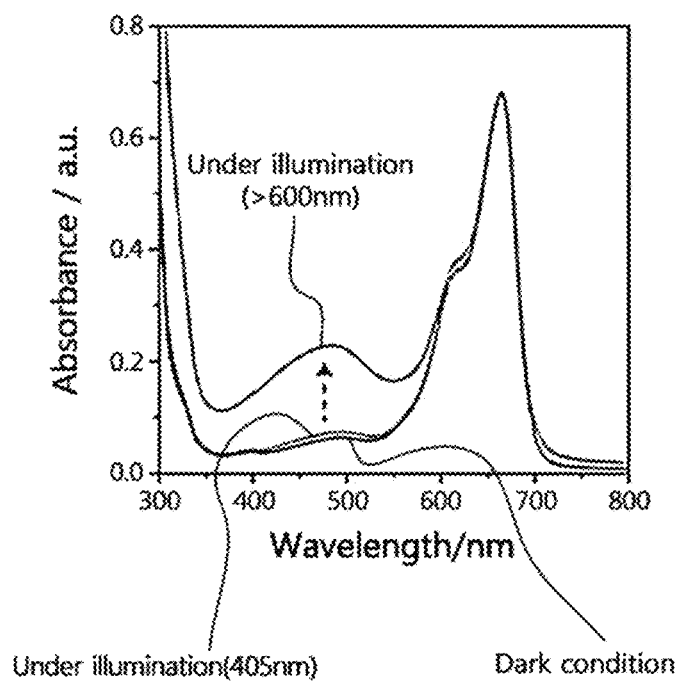

[FIG. 4A]
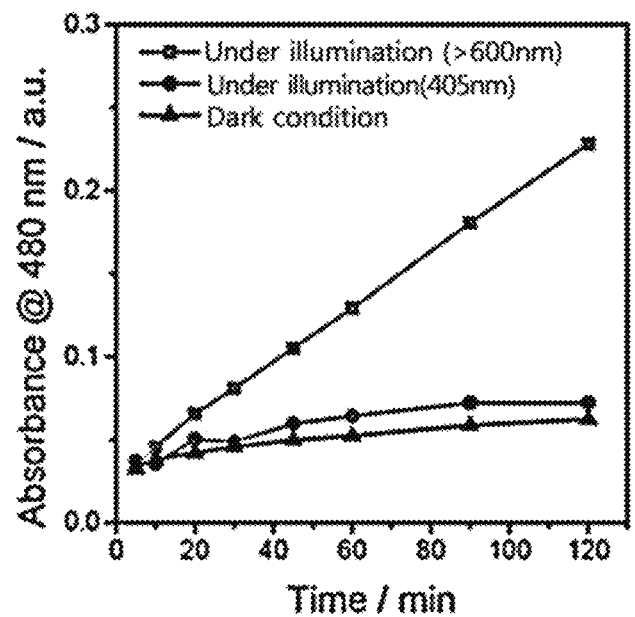
[FIG. 4B]
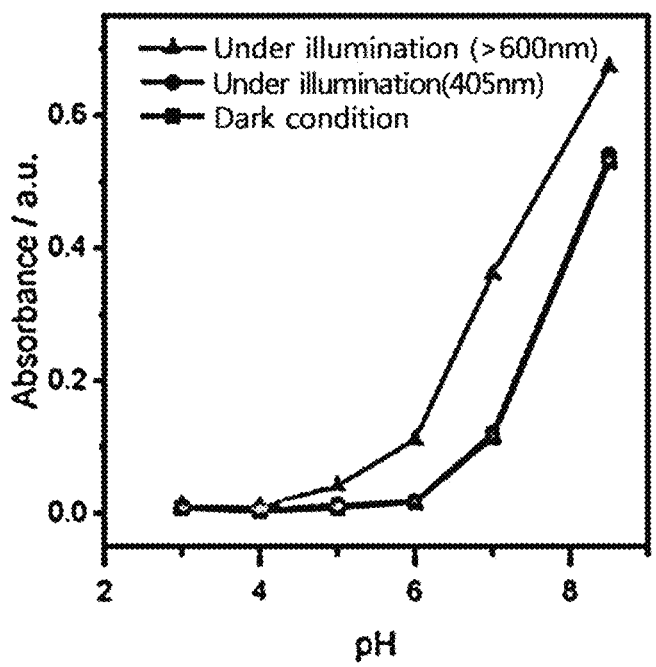

[FIG. 5]
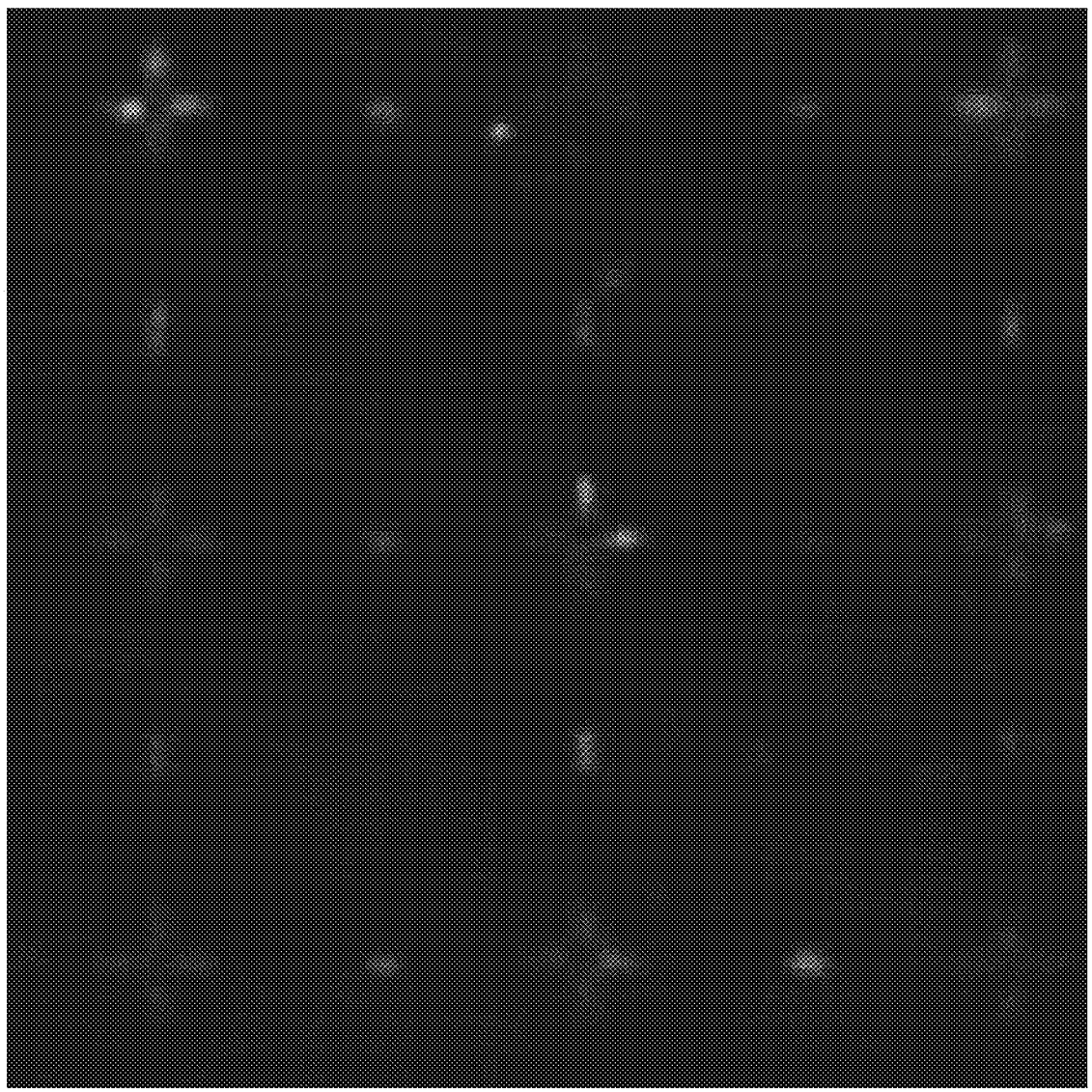

METHOD FOR SURFACE FUNCTIONALIZATION USING SINGLE PHOTON SOURCE

CROSS REFERENCE TO RELATED APPLICATION

The present application claims priority to Korean Patent Application No. 10-2021-0181873, filed Dec. 17, 2021, the entire contents of which is incorporated herein for all purposes by this reference.

TECHNICAL FIELD

The present disclosure relates to a method for selective surface functionalization using a single-photon source.

DESCRIPTION OF STATE-SUPPORTED RESEARCH AND DEVELOPMENT

The present disclosure is made under the Mid-level Researcher Support Project of the Ministry of Science and ICT (Coherent movement research of cooper pair by nano vibrator, No. 1711144063), and Quantum Computing Technology Development Project of the Ministry of Science and ICT (Extensible point defect-based quantum processor module development, No. 1711134725), and the Future Source National Infrastructure Technology Development Project of the Korea Institute of Science and Technology of the Ministry of Science and ICT (Intelligent Solution Technology for Disaster Safety (II), No. 1711152130) with the supervision of Korea Institute of Science and Technology.

BACKGROUND ART

A single-photon source is a quantum device that emits one photon at a time unlike classical light sources which emit photons in a lump. An ideal single-photon source is a light source which exhibits the possibility of emitting one photon in response to an external trigger of 1, i.e., one exhibiting no possibility of emitting more or less than one photon.

Single-photon sources are classified into nonlinear light sources which generate photon pairs in nonlinear media and single-photon emitter-based light sources such as atom or ion traps, molecules, color centers, quantum dots, etc.

Among them, the color centers are defects present in inorganic crystals and light is emitted due to the difference in the energy levels of electrons formed by the defects. A wide variety of color centers have been studied. The most widely used color center in quantum optics is the nitrogen-vacancy center (NV center) present in diamond.

Because the crystal defects in diamond have very stable optical properties, they are very actively used in various fields recently. For example, nano-sized crystal defects may be used as single-photon emitters or as nontoxic fluorescent biomarkers with very high optical stability.

In particular, the nitrogen-vacancy center of diamond is drawing a lot of interests as a crystal defect structure. It allows the detection and measurement of many physical properties including electric and magnetic fields. This is possible due to the spin state in the defects and quantum mechanical interactions. The nitrogen-vacancy center emits fluorescence in the red wavelength range when a light with a wavelength of 532 nm or shorter is illuminated, and electronic spin state can be determined using this optical property. The spin state is maintained for a long time at room temperature. A quantum sensor using the nitrogen-vacancy center of diamond has been studied. It is advantageous in that it can be brought close to a target substance up to nanometer (nm) scales since the sensor has an atomic unit size.

In order to conjugate the target substance with the nitrogen-vacancy center of diamond, functionalization of the diamond surface is necessary. The previously developed functionalization processes include formation of carboxyl, hydroxyl or amine groups on the entire surface of diamond through acid, UV or ozone treatment. However, these processes are disadvantageous in that the functionalization occurs at random sites regardless of the position of the nitrogen-vacancy center on the diamond surface.

Meanwhile, the polydopamine surface modification technique is based on the oxidative polymerization of dopamine which has both the catechol and amine functional groups exhibiting adhesivity in mussel adhesive proteins. Polydopamine is advantageous in that it exhibits excellent adhesivity regardless of the substrate type and a two-dimensional molecule or material may be further introduced to the coated surface.

DISCLOSURE

Technical Problem

The present disclosure provides a method for local and selective modification of a surface with a polymer using a single-photon source, and a material prepared by the method.

Technical Solution

In an aspect, the present disclosure provides a method for selective functionalization using a single-photon source, which includes: a first step of adding a single-photon source to a solution containing a photosensitizer and a monomer; and a second step of emitting a single photon from the single-photon source.

In another aspect, the present disclosure provides a selectively functionalized single-photon light source prepared by the method described above, wherein a polymer is locally functionalized on the surface of the single-photon source.

Advantageous Effects

A method for selective functionalization of a single-photon source provided by the present disclosure may be used to selectively bind magnetic materials such as magnetic molecules, magnetic nanoparticles, etc. or bioprobes such as antibodies, DNAs, RNAs, etc. on the surface of inorganic crystals having defects. Because a target can be brought close to the nitrogen-vacancy center, a strong magnetic signal can be obtained for the magnetic dipole of the target and, thus, the sensitivity and accuracy of a sensor can be improved.

BRIEF DESCRIPTION OF DRAWINGS

FIG. 1 schematically shows the nitrogen-vacancy center of diamond and the optical property of the nitrogen-vacancy center.

FIG. 2 schematically shows a process of light-controlled polymerization of dopamine using methylene blue.

FIG. 3A shows the absorbance of methylene blue depending on wavelength.

FIG. 3B shows the absorbance of a dopamine solution mixed with methylene blue under red light illumination, blue light illumination and dark conditions.

FIG. 4A shows the absorbance of a dopamine solution mixed with methylene blue at 480 nm depending on light illumination time.

FIG. 4B shows the absorbance of a dopamine solution mixed with methylene blue at 480 nm depending on solution pH.

FIG. 5 is a fluorescence image showing that polydopamine is modified locally at the nitrogen-vacancy center of diamond.

BEST MODE

Definition of Terms

In the present specification, "functionalization" refers to a process of modifying the surface characteristics of a material to add new functions, features, performance or physical properties. The modification of the surface characteristics of the material may include physical, chemical and biological modifications. For example, it may include surface coating. For instance, it may include the surface modification or coating of the surface of a single-photon source with a polymer.

In the present specification, "selective functionalization" refers to modification of only a localized portion of the material surface intended by a user.

In the present specification, a "photosensitizer" refers to a molecule which absorbs light and transfers the energy of the incident light to a neighboring molecule. It may include a material which absorbs light and emits singlet oxygen.

Hereinafter, the present disclosure is described in detail.

In an aspect, the present disclosure provides a method for selective functionalization using a single-photon source, which includes: a first step of adding a single-photon source to a solution containing a photosensitizer and a monomer; and a second step of emitting a single photon from the single-photon source. For example, the second step may include a step of illuminating light or applying voltage so that the light source can emit a single photon.

In an exemplary embodiment, a polymer polymerized from the monomer may be locally functionalized on the surface of the single-photon source, In an exemplary embodiment, the single-photon source may be an inorganic crystal or a defect in an inorganic crystal. The single-photon source may be, for example, diamond, a quantum dot (QD), hexagonal boron nitride (hBN) silicon carbide, etc., although not being limited thereto.

In an exemplary embodiment, the polymer polymerized from the monomer may be locally functionalized by a single photon emitted from the inorganic crystal or the defect in the inorganic crystal. Specifically, the polymer may be locally functionalized at the site where the single photon is emitted from the inorganic crystal or the defect in the inorganic crystal.

In an exemplary embodiment, the inorganic crystal may be diamond, and the polymer may be locally functionalized at the nitrogen-vacancy center (NVC) on the surface of the diamond. Instead of coating the entire surface of the diamond with the polymer, the diamond may be selectively functionalized by locally coating, modifying or functionalizing the polymer only at the nitrogen-vacancy center of the diamond.

In an exemplary embodiment, the photosensitizer may be a photosensitizer which emits singlet oxygen when absorbing light in a specific wavelength range. For example, the photosensitizer may be an organic dye or an inorganic nanoparticle, but any photosensitizer that emits singlet oxygen by absorbing light in a specific wavelength range may be used without limitation. For example, the organic dye may be one selected from a group consisting of methylene blue, porphyrin, chlorin, phthalocyanine, distyryl boron dipyrromethene (Distyryl boron dipyrromethene, BODIPY), xanthene and phenothiazinium, although not being limited thereto. For example, the inorganic nanoparticle may be one selected from a group consisting of fullerene, polyoxometalate, titanium dioxide ($TiO_2$) and zinc oxide (ZnO), although not being limited thereto.

In an exemplary embodiment, the monomer may be polymerized into a polymer by oxidative polymerization when a single photon is emitted in the second step. Specifically, the oxidative polymerization occurs by the singlet oxygen ($^1O_2$) emitted by the photosensitizer which has absorbed the single photon emitted in the second step. As described above, the nitrogen-vacancy center of diamond as an example of the inorganic crystal emits fluorescence in the red wavelength range when light with a wavelength of 532 nm or lower is illuminated. FIG. 2 shows methylene blue, which is a representative photosensitizer with high quantum yield that forms singlet oxygen in excited state when red light is illuminated. Therefore, methylene blue emits singlet oxygen under red light illumination. The oxidative polymerization is a method of polymerization using singlet oxygen formed by an organic dye. Any monomer that is oxidized by the singlet oxygen and initiates polymerization may be used without limitation.

In an exemplary embodiment, the method may further include: a third step of washing the single-photon source with deionized (DI) water after the second step; and a fourth step of blowing nitrogen gas to the washed single-photon source.

In an exemplary embodiment, the wavelength of the light for emitting a single photon from the single-photon source may be adjusted depending on the light absorption range of the photosensitizer. For example, when methylene blue is used as the photosensitizer, light with a wavelength in a range from 550 nm to 700 nm may be illuminated. Specifically, the light may be for obtaining singlet oxygen from methylene blue, and the light may have a wavelength of 400 nm or longer, 405 nm or longer, 410 nm or longer, 415 nm or longer, 420 nm or longer, 425 nm or longer, 430 nm or longer, 435 nm or longer, 440 nm or longer, 445 nm or longer or 450 nm or longer, and 455 nm or shorter, 460 nm or shorter, 465 nm or shorter, 470 nm or shorter, 475 nm or shorter, 480 nm or shorter, 485 nm or shorter, 490 nm or shorter, 495 nm or shorter, 500 nm or shorter, 505 nm or shorter, 510 nm or shorter, 515 nm or shorter, 520 nm or shorter, 525 nm or shorter or 532 nm or shorter.

In an exemplary embodiment, the light may be illuminated with a power of 0.5-1.5 mW. Specifically, the light may be illuminated with a power of 0.5 mW or higher, 0.6 mW or higher, 0.7 mW or higher, 0.8 mW or higher, 0.9 mW or higher or 1.0 mW or higher, and 1.1 mW or lower, 1.2 mW or lower, 1.3 mW or lower, 1.4 mW or lower or 1.5 mW or lower.

In an exemplary embodiment, the light may be illuminated for 45-75 minutes. Specifically, the light may be illuminated to the solution for 45 minutes or longer, 50 minutes or longer, 55 minutes or longer or 60 minutes or longer, and 65 minutes or shorter, 70 minutes or shorter or 75 minutes or shorter.

In an exemplary embodiment, the solution may contain the photosensitizer at a concentration of 5-15 μmol based on the total volume of the solution. Specifically, the photosensitizer may be contained at a concentration of 5 μmol or higher, 6 μmol or higher, 7 μmol or higher, 8 μmol or higher, 9 μmol or higher or 10 μmol or higher, and 11 μmol or lower, 12 μmol or lower, 13 μmol or lower, 14 μmol or lower or 15 μmol or lower, based on the total volume of the solution.

In an exemplary embodiment, the monomer in the solution of the first step may be dopamine. When specific light is illuminated to the photosensitizer, dopamine may be polymerized into polydopamine as polymerization is initiated using singlet oxygen emitted by the photosensitizer. The dopamine has both the catechol and amine functional groups exhibiting adhesivity in mussel adhesive proteins and is a representative monomer that can be polymerized by oxidative polymerization.

In an exemplary embodiment, when the monomer is dopamine, the dopamine may be contained at a concentration of 1.0-3.0 mg/mL based on the total volume of the solution. Specifically, the dopamine may be contained at a concentration of 1.0 mg/mL or higher, 1.1 mg/mL or higher, 1.2 mg/mL or higher, 1.3 mg/mL or higher, 1.4 mg/mL or higher, 1.5 mg/mL or higher, 1.6 mg/mL or higher, 1.7 mg/mL or higher, 1.8 mg/mL or higher, 1.9 mg/mL or higher or 2 mg/mL or higher, and 2.1 mg/mL or lower, 2.2 mg/mL or lower, 2.3 mg/mL or lower, 2.4 mg/mL or lower, 2.5 mg/mL or lower, 2.6 mg/mL or lower, 2.7 mg/mL or lower, 2.8 mg/mL or lower, 2.9 mg/mL or lower or 3.0 mg/mL or lower, based on the total volume of the solution.

In an exemplary embodiment, the pH of the solution may be adjusted to lower the speed of the polymerization of the monomer. For example, when the monomer is dopamine, the solution pH may be adjusted to 5.5-6.5. The polymerization speed of the dopamine to polydopamine depends on the pH, and the optimal solution pH for polymerization is 8.5. In the present disclosure, it is necessary to lower the polymerization speed of dopamine in order to locally functionalize polydopamine with the defects in the inorganic crystal. Accordingly, the solution pH is adjusted to 5.5-6.5 so as to lower the polymerization speed and allow functionalization only at the desired site. Specifically, the solution pH may be 5.5 or higher, 5.6 or higher, 5.7 or higher, 5.8 or higher, 5.9 or higher or 6.0 or higher, and 6.1 or lower, 6.2 or lower, 6.3 or lower, 6.4 or lower or 6.5 or lower.

In an aspect, the present disclosure provides a selectively functionalized single-photon source prepared by the method descried above, wherein a polymer is locally functionalized on the surface of the single-photon source.

In an exemplary embodiment, the single-photon source may be an inorganic crystal, and the inorganic crystal may be locally functionalized with a polymer.

In an exemplary embodiment, the polymer may be locally functionalized by a defect in the inorganic crystal.

In an exemplary embodiment, the single-photon source may be diamond, and a polymer may be locally functionalized at the nitrogen-vacancy center on the surface of the diamond.

In an exemplary embodiment, the polymer may be polydopamine. The polydopamine is advantageous in that it exhibits excellent adhesivity regardless of the surface type and a two-dimensional molecule or material may be further introduced to the coated surface.

Hereinafter, the present disclosure is described in more detail through examples. The following examples are only illustrative and the scope of the present disclosure is not limited by the examples. It is to be understood that various modifications and changes to the subject matter described in the claims of the present disclosure are included in the scope of the present disclosure.

Examples

1. Investigation of Absorbance of Methylene Blue Depending on Wavelength of Illuminated Light In order to investigate the absorbance of methylene blue depending on the wavelength of illuminated light, 2 mg/mL dopamine hydrochloride and 10 μmol methylene blue were added to a pH 6 buffer solution.

Using three cuvettes, one was illuminated with red light (1 mW), the other was illuminated with blue light (1 mW) and the remaining one was incubated under dark condition for 1 hour. Then, absorbance was measured using a UV-vis spectrophotometer.

As shown in FIG. 3B, the absorbance of the dopamine solution mixed with methylene blue was increased under red light illumination.

2. Investigation of Absorbance of Methylene Blue Depending on Light Illumination Time In order to investigate the absorbance of methylene blue depending on light illumination time, 2 mg/mL dopamine hydrochloride and 10 μmol methylene blue were added to a pH 6 buffer solution.

Using three cuvettes, one was illuminated with red light (1 mW), the other was illuminated with blue light (1 mW) and the remaining one was incubated under dark condition. Then, the absorbance of the dopamine solution mixed with methylene blue was measured with time. The result is shown in FIG. 4A.

3. Investigation of Absorbance of Methylene Blue Depending on Solution pH

Solutions with pH 3, 4, 5 and 6 were prepared using a sodium acetate buffer, and pH 7 and 8.5 solutions were prepared using a Tris buffer.

2 mg/mL dopamine hydrochloride and 10 μmol methylene blue were added to all the buffer solutions.

Using three cuvettes, one was illuminated with red light (1 mW), the other was illuminated with blue light (1 mW) and the remaining one was incubated under dark condition for 1 hour. Then, the absorbance of the dopamine solution mixed with methylene blue was measured at 480 nm using a UV-vis spectrophotometer. As shown in FIG. 4B, the absorbance was increased rapidly at pH 6 or higher.

4. Modification of Nitrogen-Vacancy Center of Diamond with Polydopamine

After preparing a pH 6 Tris buffer and adding 2 mg/mL dopamine hydrochloride and 10 μmol methylene blue, 3 mL of the mixture solution was put in a cuvette and diamond having $10^{14}$ nitrogen-vacancy centers was added. The nitrogen-vacancy centers were introduced to a cross pattern of the diamond.

After incubation under blue light (405 nm) illumination, the diamond was washed with deionized (DI) water and then blown with nitrogen gas ($N_2$).

5. Confirmation of Polydopamine Modified on Diamond Surface

In order to confirm whether polydopamine was selectively introduced only to the nitrogen-vacancy centers of the diamond, 10 mM 4',6-diamidino-2-phenylindole was added to PBS (phosphate-buffered saline) at pH 8.5 solution and incubated overnight. Then, it was investigated whether polymerization occurred by measuring fluorescence emission at 450-600 nm.

As shown in FIG. 5, strong fluorescence was detected at the cross pattern with the nitrogen-vacancy centers, which indicates that polymerization occurred locally at the nitrogen-vacancy centers due to the red light (red single photons) emitted from the nitrogen-vacancy centers of the diamond.

The invention claimed is:

1. A method for selective functionalization using a single-photon source, comprising:
    (a) adding a single-photon source to a solution comprising a photosensitizer and a monomer; and
    (b) emitting a single photon from the single-photon source,
    wherein:
    the single-photon source is an inorganic crystal or a defect in an inorganic crystal,
    a polymer polymerized from the monomer is locally functionalized by a single photon emitted from the inorganic crystal or the defect in the inorganic crystal,
    the inorganic crystal is diamond, and
    the polymer is locally functionalized at a nitrogen-vacancy center (NVC) on a surface of the diamond.

2. The method for selective functionalization using a single-photon source according to claim 1, wherein the photosensitizer emits singlet oxygen when absorbing light in a specific wavelength range.

3. The method for selective functionalization using a single-photon source according to claim 2, wherein the photosensitizer is one selected from a group consisting of methylene blue, porphyrin, chlorin, phthalocyanine, distyryl boron dipyrromethene (BODIPY), xanthene, phenothiazinium, fullerene, polyoxometalate, titanium dioxide ($TiO_2$) and zinc oxide (ZnO).

4. The method for selective functionalization using a single-photon source according to claim 1, which further comprises:
    (c) washing the single-photon source with deionized (DI) water after (b); and
    (d) blowing nitrogen gas to the washed single-photon source.

5. The method for selective functionalization using a single-photon source according to claim 1, wherein the monomer in the solution of (a) is dopamine.

6. A selectively functionalized single-photon source prepared by the method according to claim 1, wherein a polymer is locally functionalized on the surface of the single-photon source.

7. The selectively functionalized single-photon source according to claim 6, wherein the polymer is polydopamine.

* * * * *